United States Patent [19]
Schultz

[11] Patent Number: 5,584,262
[45] Date of Patent: Dec. 17, 1996

[54] PULSATION CONTROL HAVING PULSE WIDTH MODULATING DRIVING CIRCUIT

[75] Inventor: David A. Schultz, Holmen, Wis.

[73] Assignee: Babson Bros. Co., Naperville, Ill.

[21] Appl. No.: 399,155

[22] Filed: Mar. 2, 1995

[51] Int. Cl.$^6$ ............................. A01J 5/007; A01J 5/14
[52] U.S. Cl. ........................ 119/14.28; 119/14.29
[58] Field of Search ........................ 119/14.27, 14.28, 119/14.29, 14.3

[56] References Cited

U.S. PATENT DOCUMENTS

| | | |
|---|---|---|
| 3,703,645 | 11/1972 | Swift . |
| 4,011,838 | 3/1977 | Nordegren et al. . |
| 4,399,483 | 8/1983 | Phelan . |
| 4,690,099 | 9/1987 | Gregan et al. . |

FOREIGN PATENT DOCUMENTS 204815   1/1968   U.S.S.R. ............................. 119/14.28

Primary Examiner—Todd E. Manahan
Attorney, Agent, or Firm—Wood, Phillips, VanSanten, Clark & Mortimer

[57] ABSTRACT

A milking machine pulsation control includes a microcontroller which generates a pulse width modulated drive signal to control current to pulsator valves, with a high current for pull-in and a lower current for holding. The pulse width modulated drive signal is based on line voltage and compensated for supply frequency. A zero crossing circuit controls internal switching at zero volts to reduce noise. A watchdog circuit resets the computer in the event of latch-up as a result of circuit transients. An over-current shut-down circuit the switches that operate the valve. Synchronism is provided with other pulsation controls. Operator input switches and visual displays are multiplexed to the microcontroller.

20 Claims, 13 Drawing Sheets

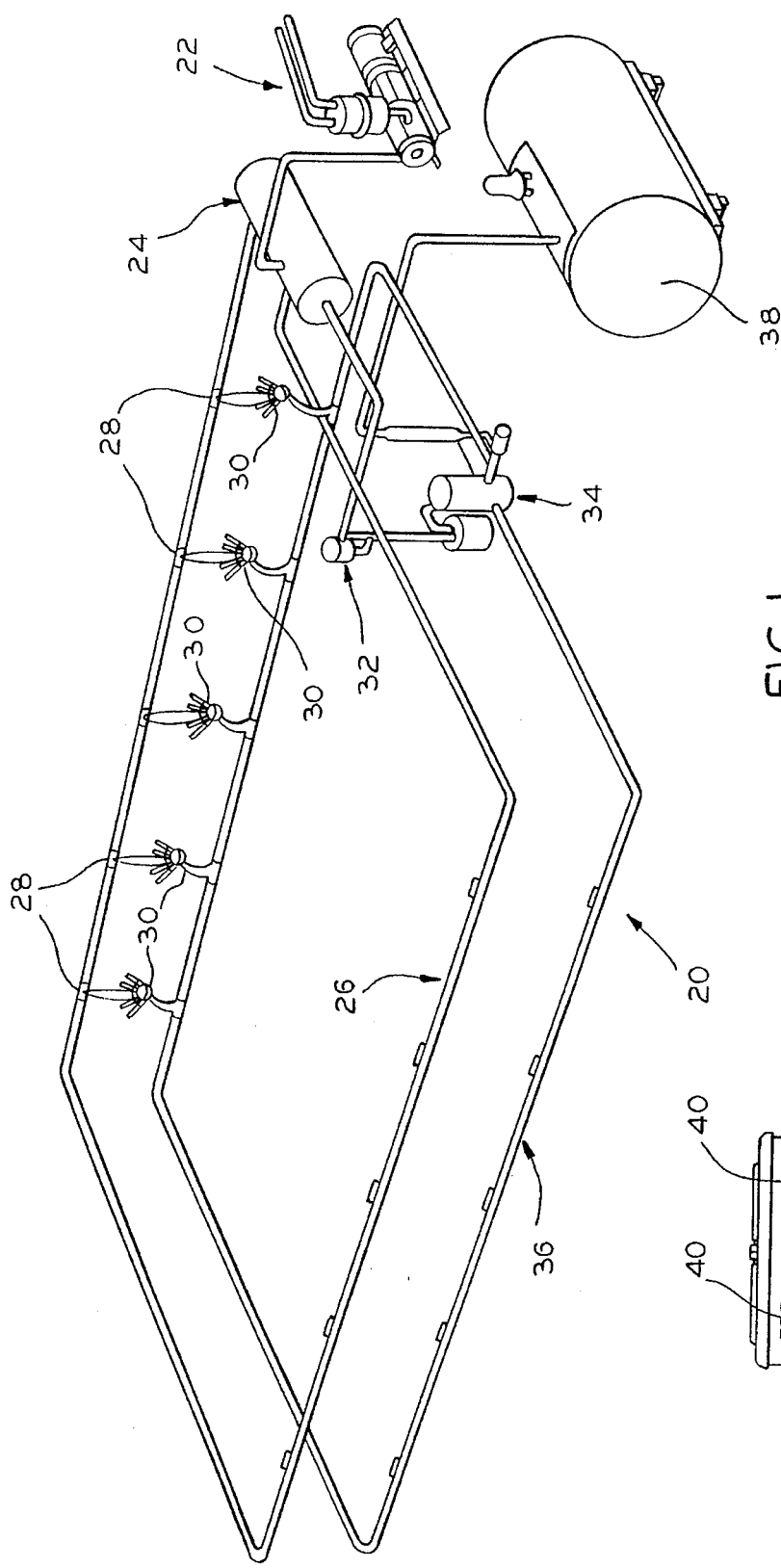
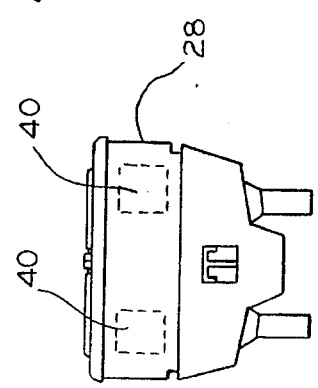
FIG.1
FIG.2

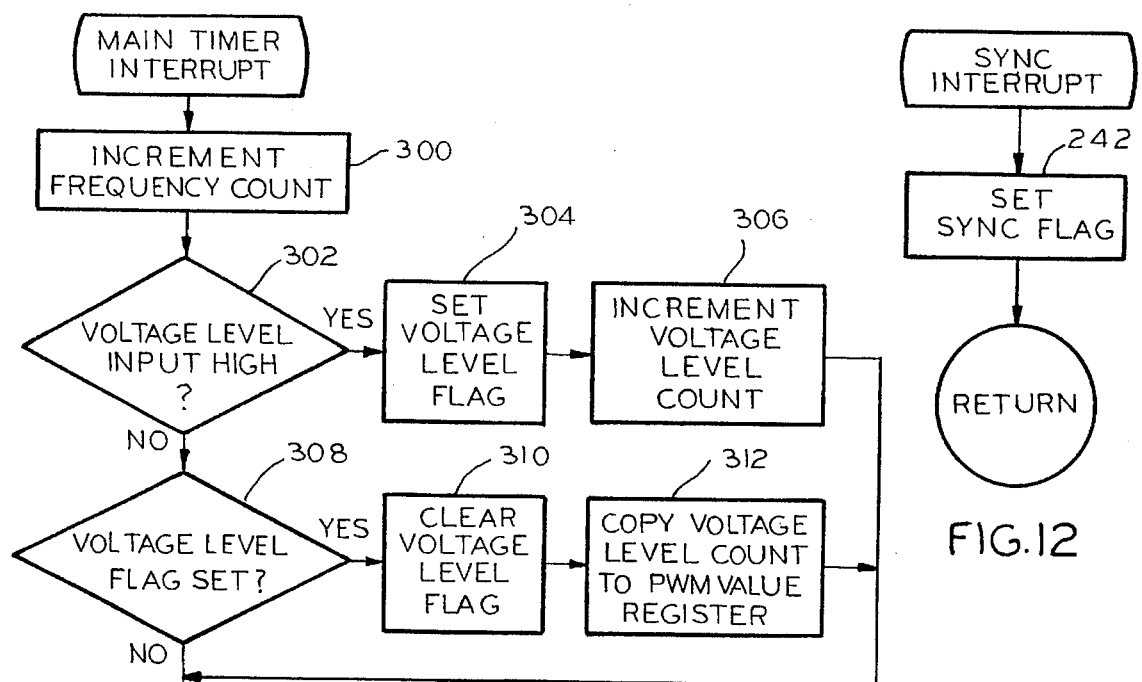
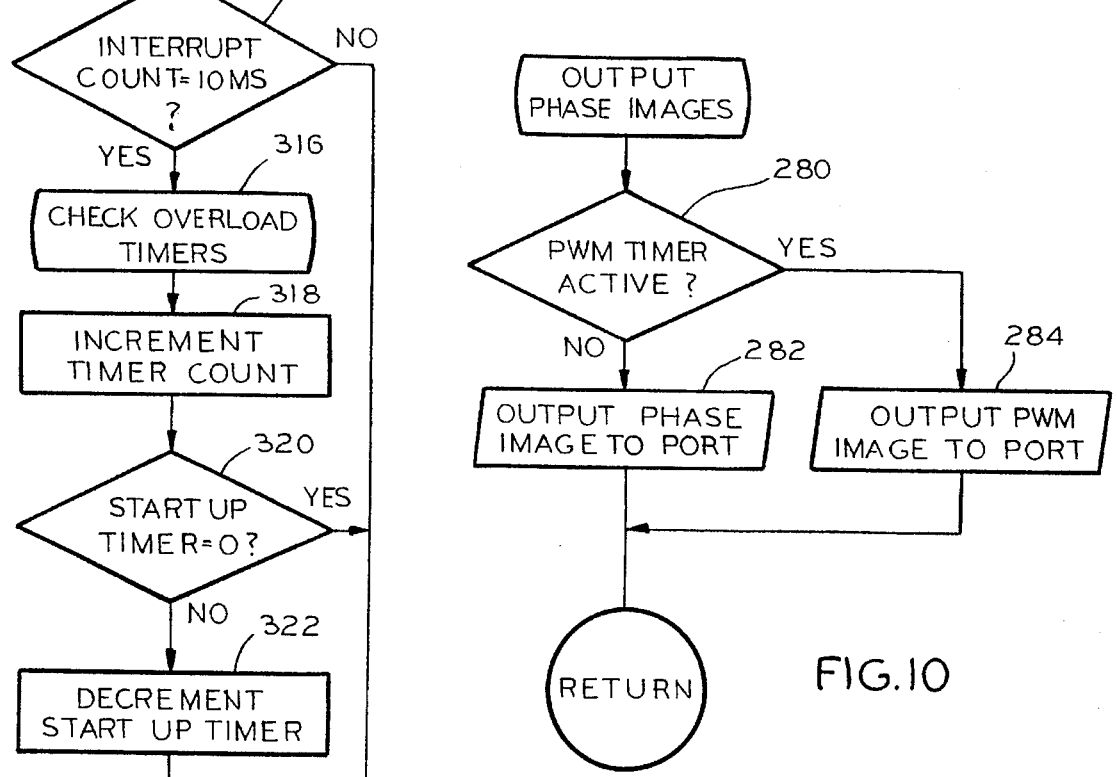
FIG. 12
FIG. 10
FIG. 11

VIEWED AS ALTERNATING PULS

VIEWED AS SINGLE PULS

PULSATION CONTROL HAVING PULSE WIDTH MODULATING DRIVING CIRCUIT

FIELD OF THE INVENTION

This invention relates to milking apparatus and, more particularly, an improved pulsation control.

1. Background of the Invention

A milking system such as that used in a milking parlor includes a milk line and pulsator airline each extending around the parlor. A plurality of milking units are connected to the milk line. Each milking unit is attached to a cow to transfer milk from the cow to the milk line. The pulsator airline controllably transfers vacuum to a plurality of pulsators. Each pulsator includes one or more electrically operated valves to intermittently evacuate atmospheric air from the pulsation chamber of the teat cup in the milking unit. This action opens and closes the liner in the teat cup to perform the milking function. Doing so requires driving a solenoid associated with the valve with full power to ensure shifting of a related solenoid armature. The full power is maintained until the valve is permitted to be released during the milking function. The application of full power during the entire on state of the valve can result in substantial power consumption, particularly in a milking parlor or barn utilizing plural pulsators.

Within a milking parlor problems can also result due to vacuum fluctuations caused by too many valves being energized simultaneously. These vacuum fluctuations can produce a less than desirable cow milking situation.

The present invention is directed to solving one or more of the problems discussed above in a novel and simple manner.

2. Summary of the Invention

In accordance with the invention there is provided a milking machine pulsation control which reduces electric power consumption.

In accordance with another aspect of the invention a milking machine pulsation control for controlling a plurality of pulsators synchronizes operation of the plural pulsators.

Broadly, there is disclosed herein a milking machine pulsation control for controlling a pulsator having an electrically controlled valve to alternately direct air and vacuum to a milking unit. The pulsation control includes an electrical power source. A driver circuit means is electrically connected to the power source in the valve for controlling energization of the valve. Timer means are connected to the driver circuit means for controlling operation of the driver circuit means. The timer means controls the driver circuit means to deliver power to the valve at a first select level sufficient to energize the valve and subsequently deliver power to the valve at a second select level, lower than the first select level, to maintain energization of the valve and to reduce power consumption.

In accordance with the invention the timer means delivers power at the first select level for a preselected period of time. The power source develops power at a rated level, comprising the first select level, and the timer means operates the driver circuit means to continuously connect the power source to the valve for the preselected period of time and to subsequently pulse width modulate operation of the driver circuit means to maintain the second select level.

In accordance with another aspect of the invention there is provided means for monitoring power from the power source and wherein the timer means includes means for adjusting pulse width according to monitored power to maintain power at the second select level.

In accordance with another aspect of the invention the power source comprises a full wave rectified supply and the driver circuit means comprises a switch selectively connecting the power source directly to the valve. The timer means drives the switch for a time sufficient to energize the valve and subsequently to pulse width modulate the switch to chop full wave rectified power supply to the valve to reduce power consumption.

In accordance with another aspect the pulsation control includes means for monitoring power from the power source and wherein the timer means includes means for adjusting a chopping delay according to monitored power to maintain power at the second select level.

In accordance with yet another aspect of the invention the pulsation control includes means for detecting a zero crossing of the supply and the timer means synchronizes operation of the switch relative to the zero crossing. The timer means operates the switch at the zero crossing to minimize radiated electrical noise.

In accordance with a still further aspect of the invention there is provided means for determining if the valve operates at a lower power level than a rated power level of the supply and wherein the timer means includes means for pulse width modulating the switch during the select time to derive the lower power level.

In a preferred embodiment of the invention the timer means comprises a programmed processor operating in accordance with a stored program.

In accordance with a further aspect of the invention a milking machine pulsation control is provided for controlling a plurality of pulsators each having one or more electrically controlled valves to alternately direct air and vacuum to a milking unit. The control includes an electrical power source. A driver circuit includes plural output channels, one for each valve, each output channel being electrically connected to the power source and an associated valve for controlling energization of its associated valve. Control means are connected to the driver circuit for controlling operation of the driver circuit, the control means controlling the driver circuit to synchronize operation of each output channel relative to the other output channels to minimize vacuum fluctuations.

The control means controls all of the output channels to milk at a uniform pulsation rate and controls each output channel independently to maintain a desired milk:rest ratio.

There is further provided an interface for connecting the pulsation control to the other pulsation controls to synchronize the output channels of multiple pulsation controls.

More particularly, a microcontroller generates a pulse width modulated drive signal which controls current to pulsator valves, with a high current for pull-in and a lower current for holding. The pulse width modulated drive signal is based on line voltage and compensated for supply frequency. A zero crossing circuit controls internal switching at zero volts to reduce noise. A watchdog circuit resets the computer in the event of latch-up as a result of circuit transients. An over-current shut-down circuit protects the switches that operate the valve. Synchronism is provided with other pulsation controls. Operator input switches and visual displays are multiplexed to the microcontroller.

Further features and advantages of the invention will be readily apparent from the specification and from the drawing.

BRIEF DESCRIPTION OF THE DRAWING

FIG. 1 is a perspective view illustrating a typical pipeline system for milking parlors;

FIG. 2 is a pulsator used in connection with the system of FIG. 1;

FIGS. 4–16 comprise a series of flow charts illustrating a program implemented by the microcontroller of FIG. 3;

DETAILED DESCRIPTION OF THE INVENTION

Figure 3:
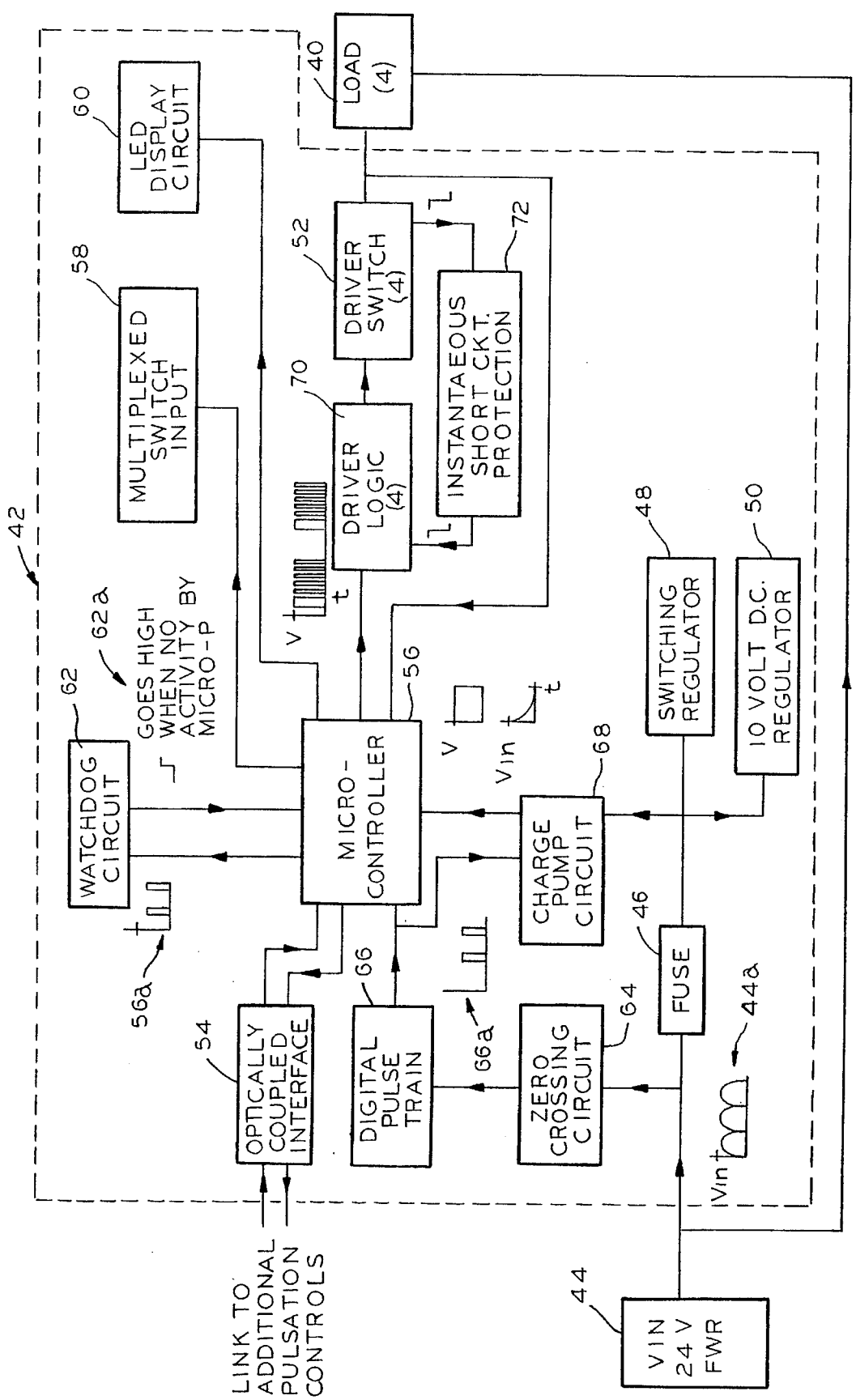
FIG. 3 is a block diagram of a pulsation control for controlling the pulsator of FIG. 2.

Referring to FIG. 1, a low line pipeline system 20 for a milking parlor is illustrated. The system 20 includes a vacuum pump 22 connected to a distribution tank 24. The distribution tank 24 is in turn connected to a looped pulsator airline 26 which extends around the parlor and transfers vacuum to a plurality of pulsators 28. Each pulsator 28 is in turn connected to a milking unit 30. As is well known, the pulsator 28 intermittently evacuates atmospheric air from a pulsation chamber of one or more teat cups in the milking unit 30 to open and close a liner to perform the milking function.

The distribution tank 24 is also connected via a vacuum controller 32 and milk receiving equipment 34 to a milk line 36 which also extends around the parlor. The milk line 36 is in turn connected to each milking unit for transporting milk from the milking units 30 to a bulk tank 38.

Referring to FIG. 2, a typical pulsator 28 is illustrated. The pulsator 28 may take any known form. The particular structure of the pulsator does not form part of the invention. The invention is particularly directed to a separate means for controlling the pulsator 28, or a similar pulsator. The pulsator 28 has a pair of electrically operated valves 40 which are actuated by electrical control signals, as described below, to alternately direct air and vacuum to the milking units 30. The pulsator 28 may provide for simultaneous milking of all four quarters or alternate milking of the front and rear quarters, one of the valves 40 being operable for the front quarters and the other for the rear quarters.

With reference to FIG. 3, a block diagram illustrates an electrical circuit for a pulsation control 42 according to the invention. The pulsation control 42 synchronizes four output channels, each of which can be connected to a pulsator valve 40. In accordance with the invention, the pulsation control 42 synchronizes multiple channels to minimize vacuum fluctuations in the milking system. Further, the pulsation control 42 utilizes a closed loop, voltage dependent pulse width modulation scheme to provide a high-current pull-in and low-current holding of a pulsator valve 40. Particularly, in order to obtain a more efficient operation of the pulsator 28, the control 42 supplies the valve 40 with an amount of electrical power required to provide reliable operation. This is done by initially driving the valve 40 with full power for a time just long enough to allow an included armature to shift. Subsequently, the power is reduced to a level sufficient to maintain the valve 40 in the on state. The reduction of power is accomplished via a pulse width modulation scheme which chops the input power, providing a reduced power level or holding voltage. This is done using a full-wave rectified DC power signal for input power. To minimize an emitted electro-magnetic interference, the control 42 switches the driver circuit at a zero crossing of the input power. The power saving delay is adjusted to provide a predetermined holding voltage regardless of variances in input power.

The pulsation control 42 includes an electric power source 44 in the form of a 24 volt full wave rectified DC supply. The supply 44 develops a voltage input signal as represented by the curve 44a. The supply 44 is connected via a fuse 46 to a 10 volt DC regulator circuit 50 which develops supply necessary to drive driver switches 52, discussed below and power for generating supply necessary to drive a serial link driver 54, also discussed below. A 5 volt DC switching regulator circuit 48 develops regulated DC power for powering circuit board components.

The pulsation control 42 is controlled by a microcontroller 56, such as a type 87C51 microcontroller including on-board microprocessor, related memory components and other necessary circuits. The microcontroller 56 operates as a programmed processor for controlling operation of the pulsation control 42. The microcontroller 56 decodes all of the user rate and ratio settings set by banks of dip switches forming part of a multiplex switched input circuit 58. The microcontroller 56 also drives an LED display circuit 60. The switches are used for user selection of rate and ratio. The rate comprises the number of complete pulsation circuits per minute. For example, with a rate of sixty pulsations per minute, the liner opens and closes once each second. The ratio defines the relative on and off time or duty cycle for pulsator operation. This is the ratio of milk time to rest time during each pulsation cycle.

Figure 18:
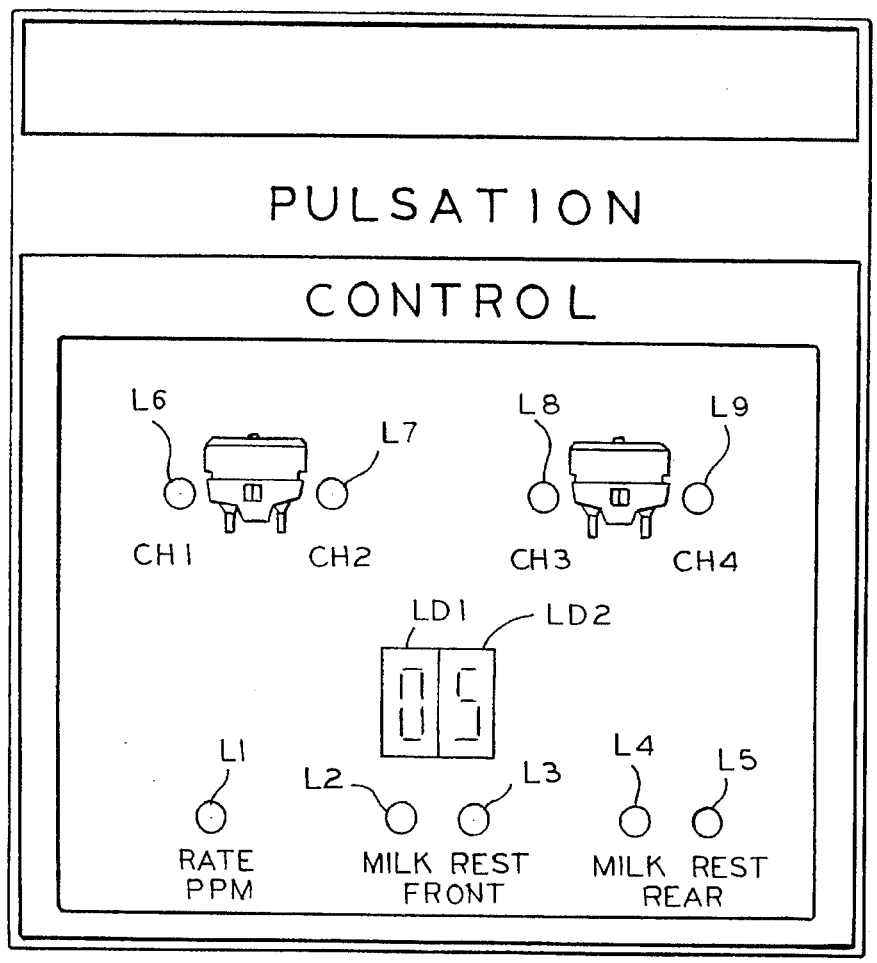
FIG. 18 is an elevation view of a display panel for the control of FIG. 3.

The microcontroller 56 displays the rate and ratio settings using a combination of five status LED's L1, L2, L3, L4 and L5, and two seven segment display modules LD1 and LD2, on a control panel 61, see FIG. 18. The actual rate and ratio are both displayed on the seven segment display modules LD1 and LD2. If rate is being displayed, then the LED L1 is lighted. If the on phase of the front drivers is being displayed, then LED L2 is lighted, while if the off phase of the front drivers is being displayed, then the LED L3 is lighted. If the on phase of the rear driver is being displayed, then LED L4 is lighted, while if the off phase of the rear driver is being displayed, then LED L5 is lighted. The corresponding seven segment display will show a two digit ratio, e.g., sixty then forty. The control panel 61 also includes LEDs L6, L7, L8 and L9, each associated with the respective four output channels. The LEDs L6–L9 are on if its associated output channel is on.

In a serial mode two pulsation controllers 42 can be wired together via the optically coupled interface 54 which is connected to the microcontroller 56. When pulsation commences, the microcontroller 56 assumes that it is a master unit and outputs a pulse to the optically coupled interface 54. This is an output synchronization signal. The master unit therefore drives the input of an optically coupled interface 54 of a second unit. For the slave or second unit, a synchronization signal is received by the microcontroller 56 which causes the second unit to synchronize its output drive signals with that of the first unit.

During normal program operation the microcontroller 56 outputs a watchdog pulse train signal, see 56a, to a watchdog circuit 62. The watchdog circuit 62 returns a signal 62a to the microprocessor which remains low as long as the pulse train 56a is received, but goes high in the absence of the pulse train to reset the microcontroller 56.

As discussed above, the pulsation control 42 utilizes pulse width modulation control to develop a holding current for the pulsators 28, see FIG. 2. To do so it is necessary that supply switching is accurately synchronized to the supply signal. This is done by using a zero crossing circuit 64 connected to the supply 44 for detecting the point at which the supply voltage drops to approximately zero volts. The microcontroller 56 uses this point as a reference time. The zero crossing circuit 64 is connected to a digital pulse train circuit 66 which develops a pulse signal, see 66a, with each pulse corresponding to a zero crossing of the supply and comprising a synchronization signal.

For the microcontroller 56 to correctly set the output voltage using pulse width modulation, the control 42 must monitor the voltage level of the supply 44. This is accomplished using a charge pump circuit 68 connected between the fuse 46 and switching regulator 48. The charge pump circuit 68 includes a charging capacitor (not shown). The microcontroller 56 uses the timing of the zero crossing pulses 66a and determines the time required to charge the charging capacitor which is proportional to the supply voltage. Thus, the microcontroller 56 actively determines the steady state voltage of the supply used to adjust the pulse width modulation to generate the constant hold voltage during variations in supply voltage.

The microcontroller 56 drives four similar output channels, only one of which is discussed in detail. Each channel includes a driver logic circuit 70 connected between the microcontroller 56 and the driver switch 52. The logic circuit 70, operates as an interface between the microcontroller 56 and the driver switch 52. The logic circuit 70 receives a drive signal such as represented by the curve 70a showing a continuous pulse for a preselect period of time sufficient to provide latching of the valve 40, followed by a pulse width modulated signal sufficient to maintain latching of the valve 40. The driver switch 52 comprises a MOSFET. The supply 44 is connected to one side of the valve 40, the other side of which is connected to the switch 52. The switch 52 causes the MOSFET 52 to permit current flow from its source to the drain to energize the coil of the valve 40. To switch off the channel, the switch 52 is disabled from sinking current. While the switch 52 is in its "on" state and is pulling current down through the load 40, the load drive current is sampled by a protection circuit 72 which shuts down the output in the event of high current. The output is also connected back to the microcontroller 56. If the microcontroller 56 sees that an over-current condition is present for longer than three seconds then all output channels are shut down for a period of three seconds. The over-current condition is latched independently of the microcontroller 56 by the protection circuit 72 and remains latched until the output channel in the microcontroller 56 is driven high. Therefore, if an over-current situation persists the user will see that one channel is permanently switched off, although in fact it is enabled for a few microseconds, and that the three other channels are pulsed correctly for three seconds and then switched off for three seconds. After five loops with an overcurrent condition present the microcontroller 56 shuts down the output channels and displays an error message.

Although not shown, a conventional clock circuit is connected to the microcontroller 56 to set the clock frequency of the microcontroller 56 to 12 megahertz.

FIGS. 4–16 comprise a series of flow charts illustrating a software program implemented by the microcontroller 56 of FIG. 3. As is conventional, the software is stored in an on-board memory of the microcontroller and responds to inputs received by the microcontroller 56 and therefrom controls outputs, particularly the driver switches 52 via the driver logic 70.

Figure 4:
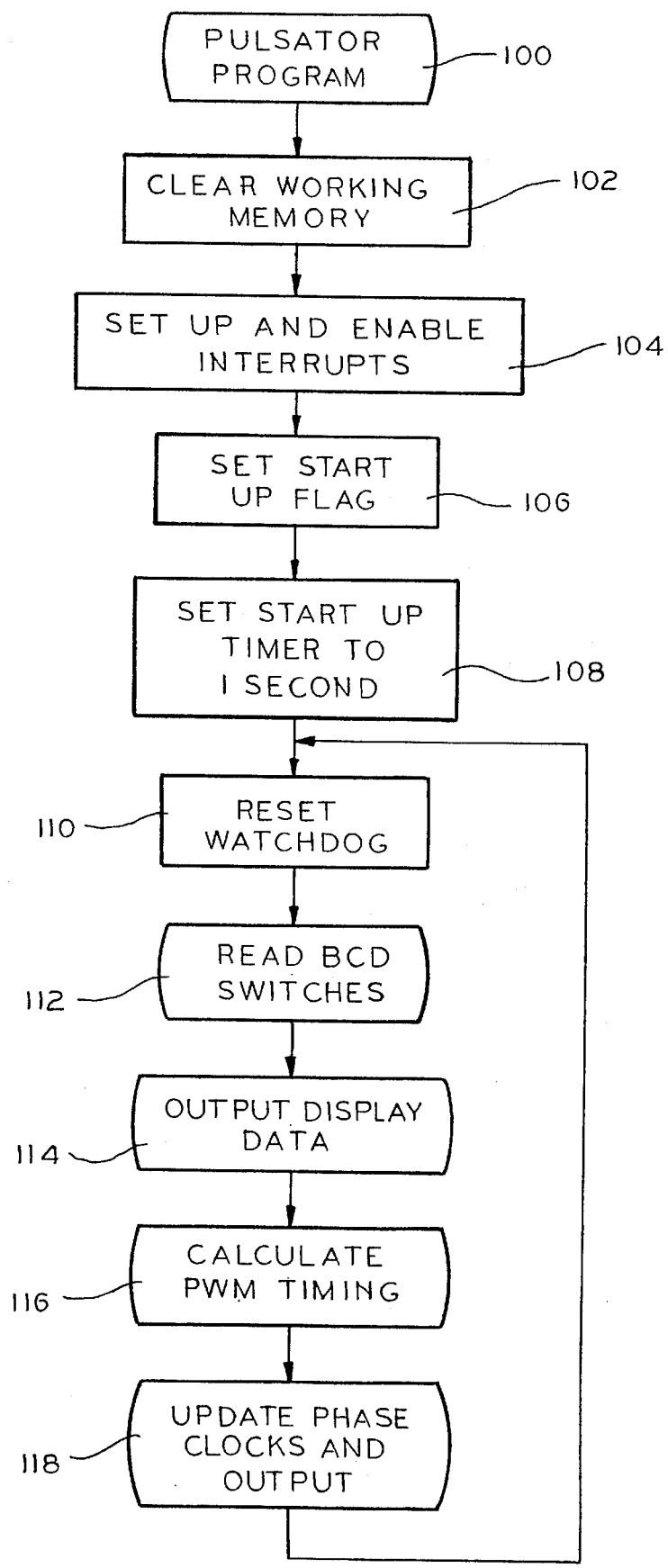

Referring initially to FIG. 4, an initialization routine and main loop is illustrated. The pulsator program begins at a node 100 at power-up or after reset. The working memory is then cleared at a block 102 and the various interrupts are set up and enabled at a block 104. A start-up flag is set at a block 106 and a start-up timer is set to one second at a block 108. The blocks 102–108 are implemented only as an initialization routine. Thereafter, the main loop continuously repeats itself until the control 42 is powered down or upon a reset condition being set.

The main loop begins at a block 110 which resets the watchdog to control the pulse train 56A, see FIG. 3. A READ BCD SWITCHES routine is then implemented at a block 112, followed by an OUTPUT DISPLAY DATA routine at a block 114, a CALCULATE PWM TIMING routine at a block 116 and an UPDATE PHASE CLOCKS AND OUTPUT routine at a block 118. The main loop then returns to the block 110 to continue processing.

Figure 5:
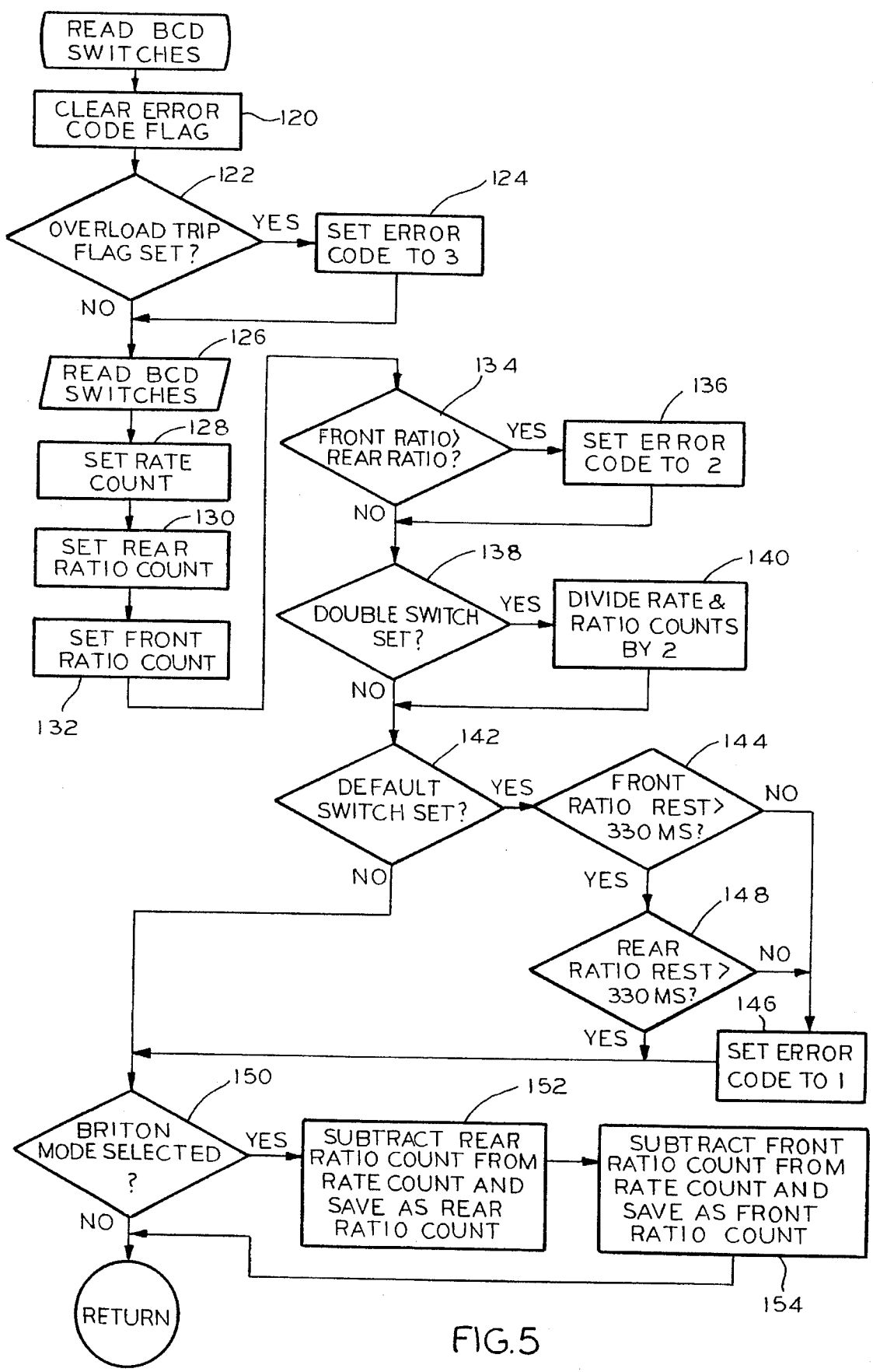

Referring to FIG. 5, the READ BCD SWITCHES routine, called at the block 112 of FIG. 4, is illustrated.

The BCD SWITCH INPUT routine begins at a block 120, which clears any error code flag. A decision block 122 then determines if an overload trip flag is set. If so, then an error code is set to 3 at a block 124. Thereafter, the BCD switches from the multiplex switch input circuit 58, see FIG. 3, are read at a block 126. These are the switches used for setting the rate and ratio, as discussed above. The rate count read from the switches is set at a block 128. The rear ratio count is set at a block 130 and the front ratio count is set at a block 132. The blocks 128, 130 and 132 utilize look-up tables stored in memory of the microcontroller 56. Particularly, the memory stores sixty-four possible settings for rate count and eight possible settings for the ratios. The switch settings are used to select from the available look-up table settings.

Once the values are set, then a decision block 134 determines if the front ratio is greater than the rear ratio. Since more milk is contained in the rear of the udder, the rear ratio is normally higher. If the front ratio is higher, then an error code is set to 2 at a block 136 to display an error condition. Thereafter, or if the front ratio is not greater than the rear ratio, then a decision block 138 determines if a double switch is set. The double switch is used to select from a second look-up table of rate settings, effectively doubling the available settings. If the double switch is set, then the rate and ratio counts are divided by two at a block 140. Thereafter, a decision block 142 determines if a default switch is set. This is used to set the rate and ratio according to common practices. If so, then a decision block 144 determines if the front ratio rest time is greater than 330 milliseconds. If not, then an error code is set to 1 at a block 146. If so, the a decision block 148 determines if the rear ratio rest time is greater than 330 milliseconds. If not, then the error code is set at the block 146. These are done to ensure that the reset time is sufficient within each cycle. Good cow milking practice requires at least 300 msec. of rest time.

Thereafter, a decision block 150 determines if a bitron mode is selected. The program is configured to operated with direct pulsating valves which turn on when energized. Some milking pulsators use indirect valves which operate oppositely. The bitron mode is provided to allow use of the control 42 with either direct or indirect operating valves. If the bitron mode is selected, then the rear ratio count is inverted at a block 152 and the front ration is inverted at a block 154. Thereafter, the routine ends as by returning to the main loop of FIG. 4.

Figure 6:
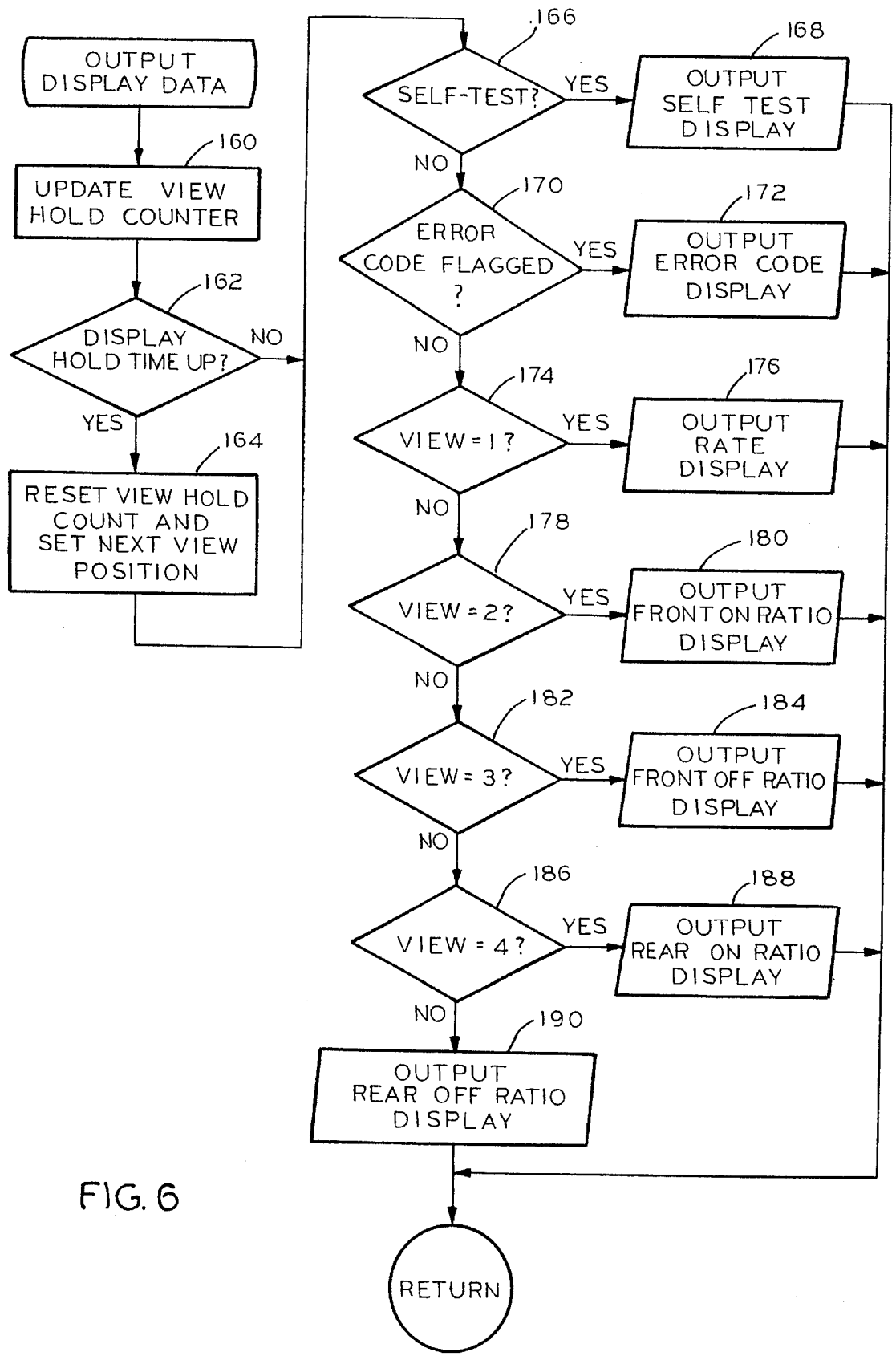

Referring to FIG. 6, the OUTPUT DISPLAY DATA routine called at the block 114 of FIG. 4 is illustrated. This routine is used for controlling the outputs to the panel display of FIG. 17. The routine begins at a block 160 which updates a view hold counter. The hold counter is used for cycling among the various displays during normal operation. A decision block 162 determines if the display hold time is up. If so, then a view hold count is reset at a block 164 and the next view position is set. Thereafter, or if the display hold time is not up, then a decision block 166 begins a loop of determining which view position was last set. The decision block 166 determines if the self-test option is set. If so, then the self test display is output at a block 168. If not, then a decision block 170 determines if an error code has been flagged. If so, then the ERROR CODE display is output at a block 172. If not, then a decision block 174 determines if the VIEW 1 display has been set. If so, then the RATE DISPLAY is output at a block 176. If not, then a decision block 178 determines if a VIEW 2 display has been set. If so, then a FRONT ON RATIO display is set at a block 180. If not, then a decision block 182 determines if a VIEW 3 display has been set. If so, then a FRONT OFF RATIO display is set at a block 184. If not, then a decision block 186 determines if a VIEW 4 display has been set. If so, then a REAR ON RATIO display is set at a block 188. If not, then the REAR OFF RATIO display is output at a block 190. From any of the blocks which output a particular display, the routine then ends by returning to the main loop of FIG. 4.

Figure 7:
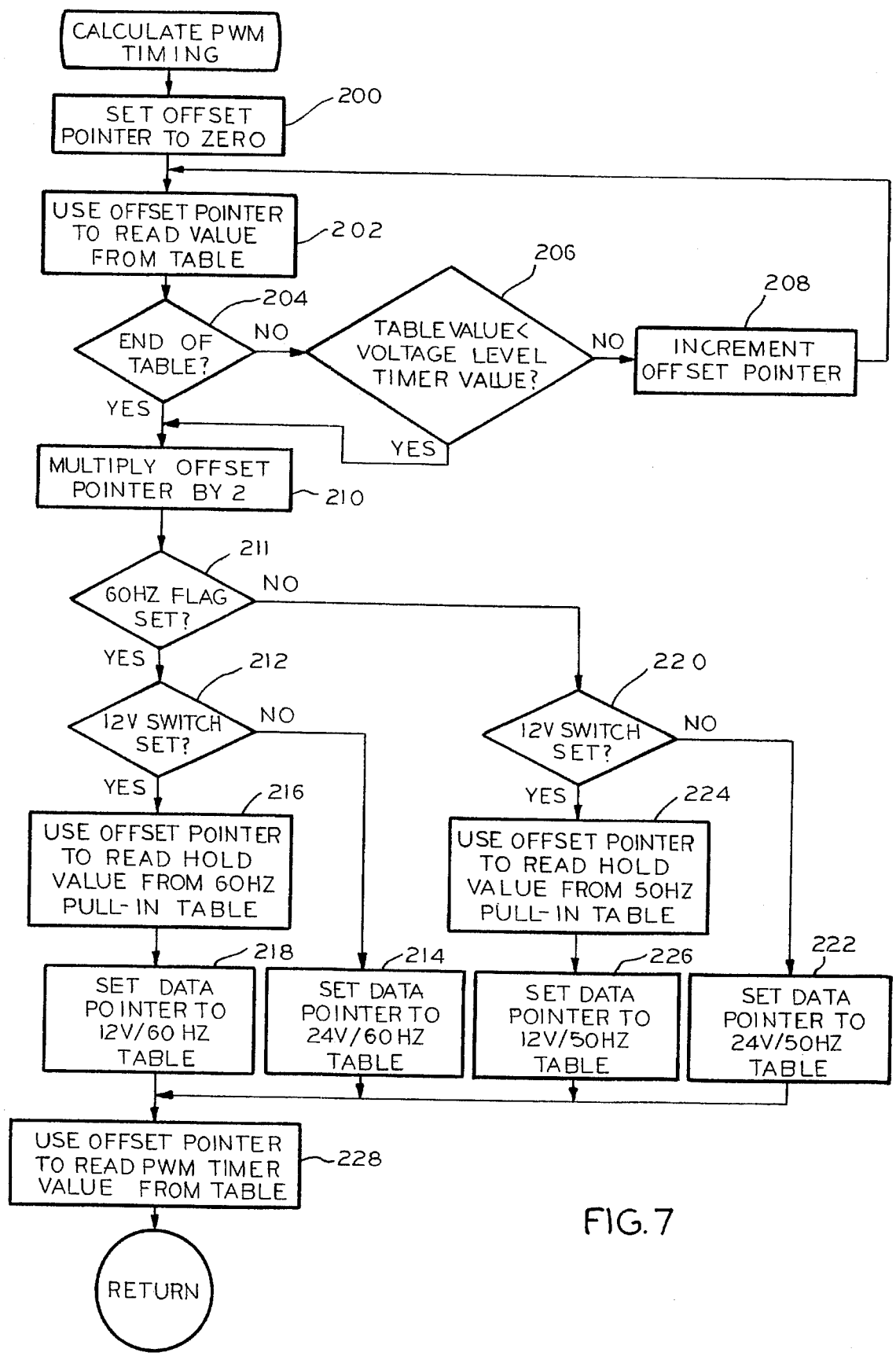

Referring to FIG. 7, the CALCULATE PWM TIMING routine called at the block 116 of FIG. 4 is illustrated. This routine is utilized to implement the power saving mode in which the output is pulse width modulated after the valve has changed position to maintain a holding position and reduce power consumption.

The routine begins at a block 200 which sets an offset point to zero. A routine is then implemented for monitoring the supply voltage utilizing the charge pump circuit. Particularly, the charge pump circuit is used to determine time for a capacitive element to charge to a known value, as discussed above. This loop begins at a block 202 which uses the offset pointer to read a voltage value from a look-up table. A decision block 204 determines if the routine is at the end of the table. If not, then a decision block 206 determines if the table value is less than the voltage level timer value. If so, then the offset pointer is incremented at a block 208 and the routine returns to the block 202. This routine continues looping until table value is less than the voltage level timer value, as determined at the decision block 206, or the end of the table, as determined at the block 204. The offset pointer is then multiplied by two at a block 210. A decision block 212 then determines if a 60 Hz flag is set. This is determined by counting the time between pulses from the zero crossing circuits 64 via the digital pulse train circuit 66, see FIG. 3. If the 60 Hz flag is set, then the decision block 212 determines if a 12 volt switch is set. This switch relates to the type of pulsator valve being used which may be of the 12 volt type or 24 volt type. If a 24 volt type, then the data pointer is set to the 24 volt, 60 Hz table at a block 214. If the 12 volt switch is set, then the offset pointer is used to read a hold value from the 60 Hz pull-in table at a block 216. The data pointer is then set to the 12 volt, 60 Hz table at a block 218. If a 12 volt model valve is selected, then the chopping input is at approximately twice the rate as for a 24 volt valve to reduce the effective output voltage.

If the 60 Hz flag was not set at the block 210, then the system is operating at 50 Hz. A similar routine is then implemented as with 60 Hz utilizing a decision block 220 and blocks 222, 224 and 226, the result of which is to set the appropriate data pointer according to the valve type and the 50 Hz rate at blocks 222 and 226. Once the data pointer is set, then the offset pointer, discussed above, is used to read a PWM timer value from a table at a block 228 and the routine then ends. This timer value sets the duty cycle of PWM operation necessary to maintain output power at a select level, lower than normal operating level, to provide a hold-in value.

Figure 8:
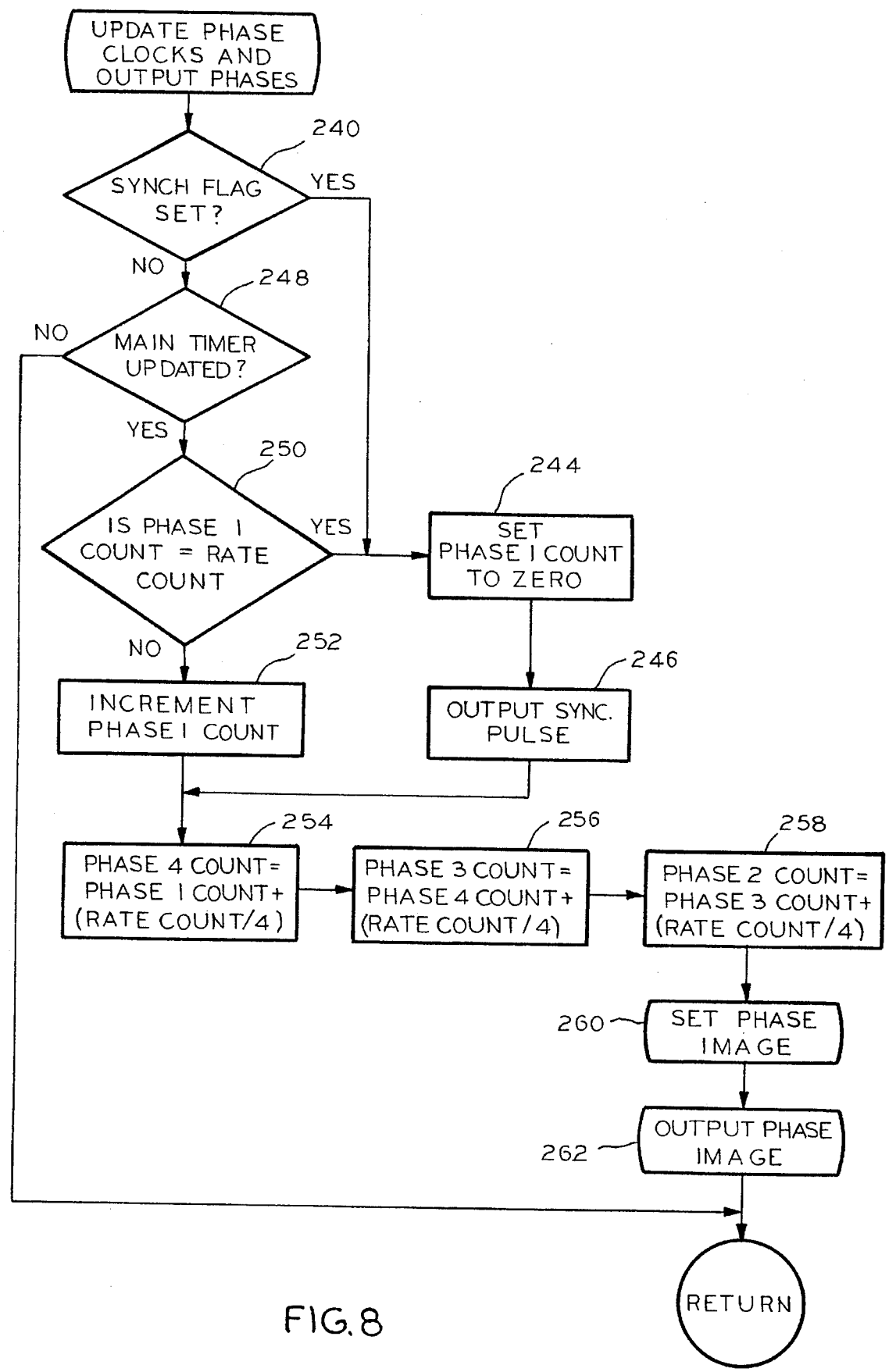

With reference to FIG. 8, a flow diagram for the UPDATE PHASE CLOCK AND OUTPUT routine called at the block 118 of FIG. 4 is illustrated. This routine is used for synchronizing the four channel outputs so that they do not turn on simultaneously. Synchronizing energization of the outputs optimizes power consumption and utilization of the vacuum supply by reducing fluctuations.

This routine begins at a decision block 240, which determines if a synchronization flag is set. With reference to FIG. 12, when a synch interrupt is received via the optically coupled interface 54, see FIG. 3, then the synch flag is set at a block 242. The synch flag is set if the particular control 42 is a slave unit which receives synchronization pulses from a master unit. If so, then its outputs are synchronized based on the synch interrupt being received from the master. Returning to FIG. 8, if the synch flag is set, then the phase 1 count is set to zero at a block 244 and a synch pulse is output at a block 246. The synch pulse is output via the optically coupled interface 54 to any connected units. This is used to provide a daisy-chain effect to transfer the synch interrupt to any other connected controllers.

If the synch flag was not set, as determined at the decision block 240, then a decision block 248 determines if a main timer has been updated. The main timer is used for controlling the pulsation cycle. If the main timer has not been updated, then the routine ends, as no changes are required. If the main timer has been updated, then a decision block 250 determines if the PHASE 1 count is equal to the RATE count. If so, then this means that the cycle has been completed and the next cycle is to begin as by proceeding to the block 244, discussed above. If the PHASE 1 count is not equal to the RATE count, then the PHASE 1 count is incremented at a block 252. The next series of blocks then increment the counts for the other three phases beginning at a block 254 which sets the PHASE 4 count equal to the PHASE 1 count plus the RATE count divided by four. A block 256 sets the PHASE 3 count equal to the PHASE 4 count plus the rate count divided by four. Finally, a block 258 sets the PHASE 2 count equal to the PHASE 3 count plus the RATE count divided by four. This has the effect of offsetting the phases so that they are spaced twenty-five percent apart within each pulsation cycle. A SET PHASE IMAGES routine is then called at a block 260 followed by an OUTPUT PHASE IMAGES routine called at a block 262. The routine then ends.

Figure 9:
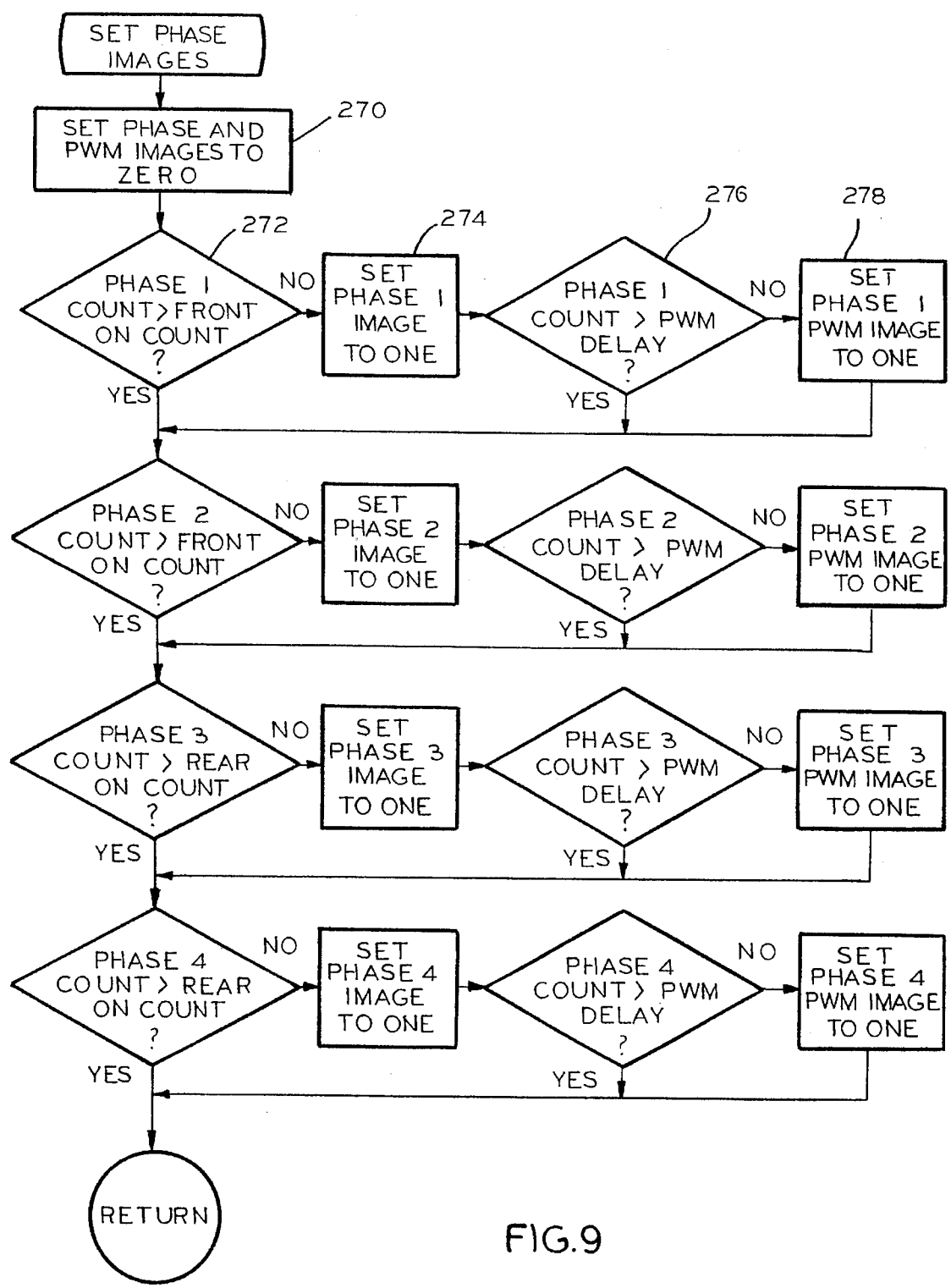

Referring to FIG. 9, the SET PHASE IMAGES routine called at the block 260 of FIG. 8 is illustrated. This routine begins at a block 270 which sets the phase and PWM images to zero. The phase and PWM images are used for setting the appropriate output conditions which will then be output at the OUTPUT PHASE IMAGES routine, discussed below. Control then proceeds to a decision block 272 which determines if the PHASE 1 count is greater than the FRONT ON count. If not, then the PHASE 1 image is set to 1 at a block 274. A decision block 276 then determines if the PHASE 1 count is greater than the PWM delay. If not, then the PHASE 1 PWM IMAGE is set to 1 at a block 278. Similar routines are then used for the PHASE 2, 3 and 4 IMAGES and PWM IMAGES to complete the routine. These routines are used to determine if the cycle is at a time at which the valves should be on, and if so, if the count indicates that the switch 52 has been driven for sufficient time to energize the valve so that the PULSE WIDTH MODULATION routine should be used to chop the full wave rectified power supply to the valve to reduce power consumption.

Referring to FIG. 10, the OUTPUT PHASE IMAGES routine called at the block 262 of FIG. 8 is illustrated. This routine begins at a decision block 280 which determines if a PWM option is active. If not, then the phase image is output to the port, i.e., the driver logic 70 of FIG. 3, at a block 282. If the PWM timer is active, then the PWM image is sent to the port at a block 284. The routine then ends.

Referring to FIG. 11, a flow diagram illustrates a routine implemented when the main timer interrupt is received from the clock. When the main timer interrupt is received, then a frequency count is incremented at a block 300. A decision block 302 determines if the voltage level input is high. If so, then a voltage level flag is set at a block 304 and a voltage level count is incremented at a block 306. If the voltage level input was not high, as determined at the decision block 302, then a decision block 308 determines if the voltage level flag is set. If so, then it is cleared at a block 310 and the voltage level count is copied to the PWM value register at a block 312. This value is used in the routine of FIG. 7 for adjusting PWM timing according to voltage offset.

A decision block 314 determines if an interrupt count is equal to ten milliseconds. If not, then the routine ends. If so, then a CHECK OVERLOAD TIMERS routine is called at a block 316. A timer count is then incremented at a block 318. A decision block 320 determines if a start-up timer is equal to zero. If so, then the routine ends. If not, then the start-up timer is decremented at a block 322 and the routine ends.

Figure 15:
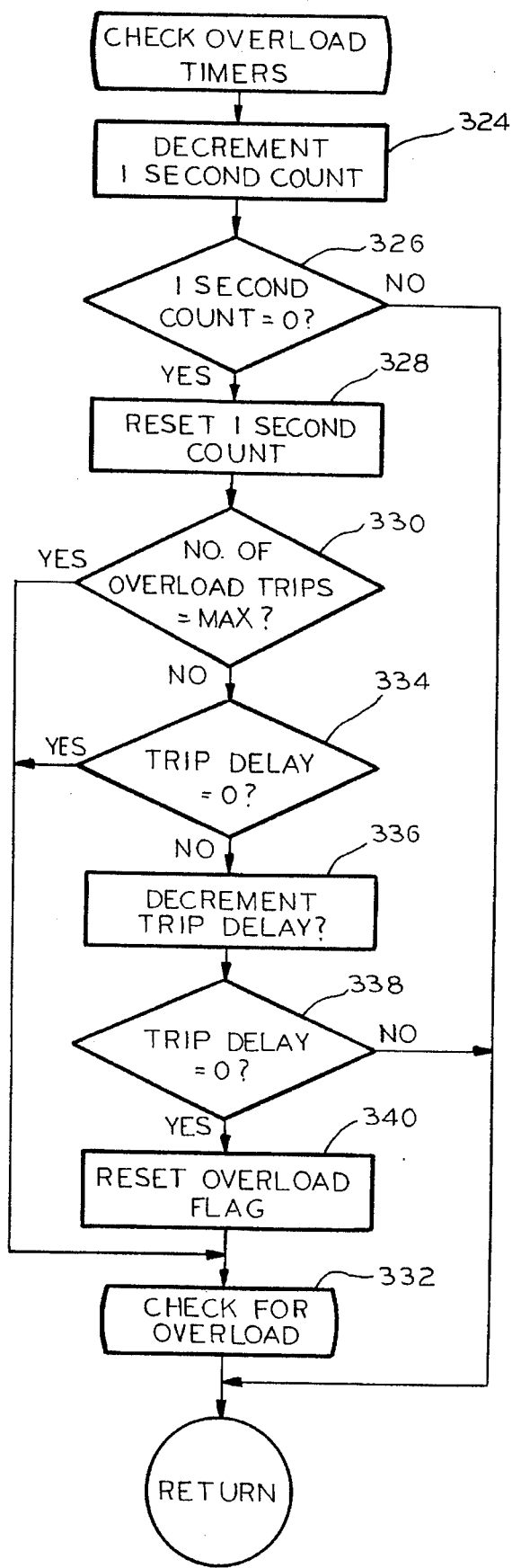

Referring to FIG. 15, a flow diagram illustrated the CHECK OVERLOAD TIMERS routine called at the block 316 of FIG. 11. This routine is used for determining if an overload condition exists and, if so, shutting down the outputs, as discussed above. Initially, a one second count is decremented at a block 324. A decision block 326 determines if the one second count is equal to zero. If not, then the routine ends. If so, then the one second count is reset at a block 328. A decision block 330 determines if the number of overload trips is equal to a preselect maximum. If so, then control proceeds to a block 332 to call a CHECK FOR OVERLOADS routine. If not, then a decision block 334 determines if a trip delay is equal to zero. If so, then the routine proceeds to the block 332. If not, then the trip delay is decremented at a block 336. A decision block 338 then determines if the trip delay is equal to zero. If not, the routine ends. If so, then the overload flag is reset at a block 340 and control proceeds to the block 332.

Figure 16:
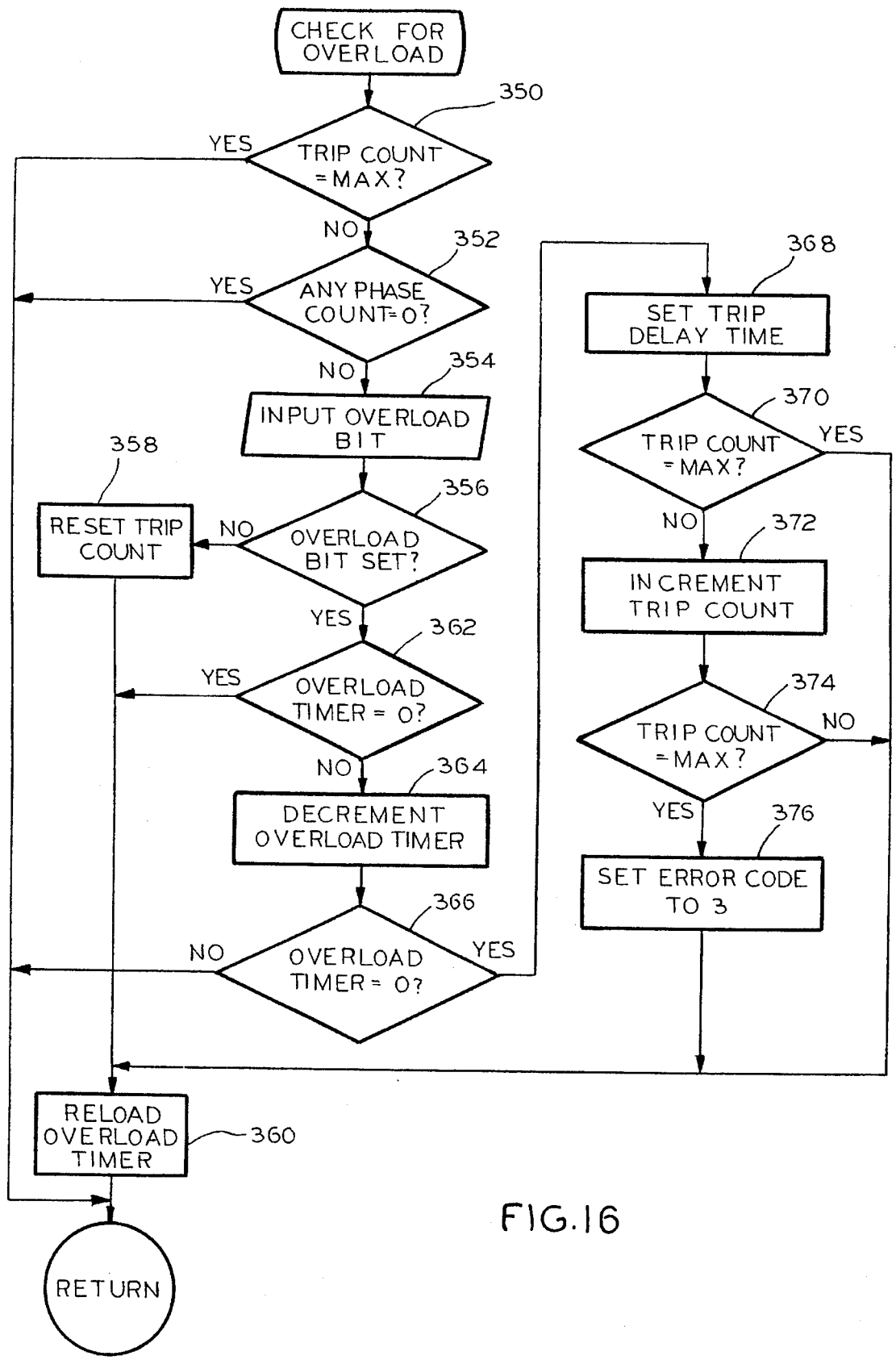

Referring to FIG. 16, a flow diagram illustrates operation of the CHECK FOR OVERLOADS routine called at the block 332 of FIG. 15. This routine is used for attempting to correct for overloads and thus continue operation to avoid complete shutdown. This routine begins at a decision block 350, which determines if a trip count is equal to the maximum. If so, then the routine ends. If not, then a decision block 352 determines if any phase counter is equal to zero. If not, then overload bit is input at a block 354. This is the input from the output circuit, discussed above. A decision block 356 determines if the overload bit is set. If not, then the trip count is reset at a block 358 and the overload timer is reloaded at a block 360 and the routine ends. If the overload bit is set, as determined at the decision block 356, then a decision block 362 determines if the overload timer is equal to zero. If so, then control proceeds to the block 360. If not, then the overload timer is decremented at a block 364. A decision block 366 again determines if the overload timer is equal to zero. If not, then the routine ends. If so, then a trip delay time is set at a block 368. A decision block 370 determines if the trip count is equal to a max. If so, then control proceeds to the block 360. If not, then the trip count is incremented at a block 372. A decision block 374 determines if the trip count is equal to the max. If not, then the routine ends. If so, then an error code is set to 3 at a block 376 and control proceeds to the block 360.

Figures 13, 14:
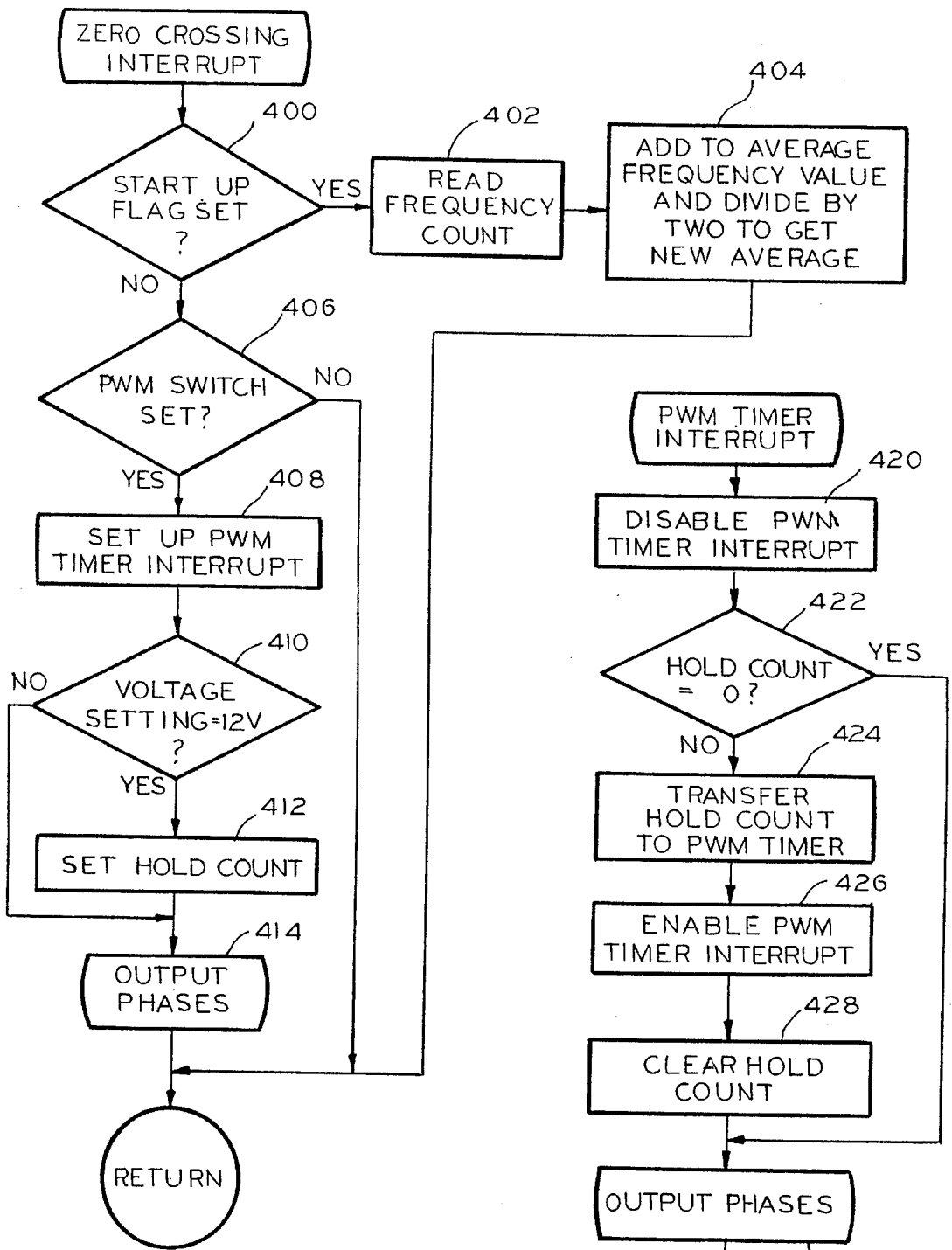

Referring to FIG. 13, a flow diagram illustrates operation of a zero crossing interrupt routine implemented when a pulse is received from the digital pulse train circuit of FIG. 3 in response to the zero crossing circuit 64. This routine begins at a decision block 400, which determines if a start-up flag is set. If so, then a frequency count is read at a block 402 which is added to the average frequency value and divided by two to obtain a new average value for frequency count at a block 404. The routine then ends.

If the start-up flag is not set, as determined at the decision block 400, then a decision block 406 determines if a PWM hardware switch is set. If not, then the routine ends. If so, then a PWM timer interrupt is set at a block 408. A decision block 410 determines if the voltage setting is equal to 12 volts. If so, then the hold count is set at a block 412. Then, or if the voltage setting is not equal to 12 volts, then the OUTPUT PHASE IMAGES routine is called at a block 414. This routine is discussed above relative to FIG. 10. The routine then ends.

Referring to FIG. 14, a flow diagram illustrates operation of a PWM timer interrupt. This routine is used to set up a hold count to determine how long after energization to drop to the PWM phase of operation. This allows for electrical and mechanical stabilization of the pulsator valve 40, see FIG. 2, and then the PWM chops the waveform to achieve the desired voltage output using closed loop control based on monitored input voltage.

This routine begins at a block 420 which disables the PWM timer interrupt. A decision block 422 determines if the hold count is equal to zero. If not, then the hold count is transferred to the PWM timer at a block 424. The PWM timer interrupt is then enabled at a block 426 and the hold count is cleared at a block 428. Thereafter, or if the hold count is not equal to zero, then the OUTPUT PHASE IMAGES routine is implemented at a block 430. This is the routine discussed above relative to FIG. 10.

Figure 17:
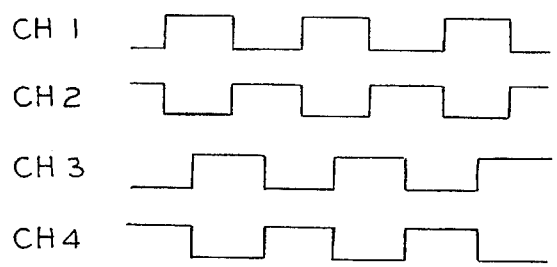
FIG. 17 comprises a series of waveforms illustrating timing synchronization signals generated by the microcontroller of FIG. 3.
Figure 17:
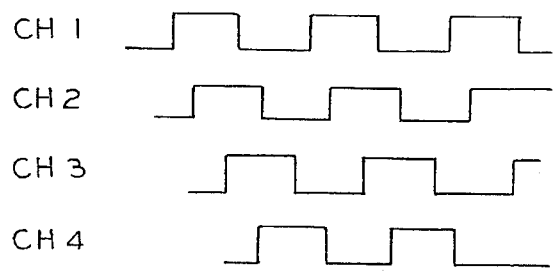

As configured, the pulsation control 42 is operable to provide alternating pulse outputs to a particular pulsator 28, see FIG. 2. As such, the milking system is set up so that for each cow being milked either the front is resting and the rear milking or vice versa. This is particularly illustrated in the upper portion of the curves of FIG. 17 showing the synchronization when viewed as alternating pulsation. Channel 1 is the front output for one pulsator, while Channel 2 is the rear output for the same pulsator 28. Channel 3 is the front output for a second pulsator, while Channel 4 is the rear output for the second pulsator. As can be seen due to the synchronization, each of the valves 40 is energized with a twenty-five percent phase delay relative to the previous valve during a pulsation cycle. The particular sequence is Channel 1, Channel 3, Channel 2 and Channel 4, with Channels 1 and 2 alternating and Channels 3 and 4 alternating. As shown, the front to rear ratio for each is set to fifty percent. However, other desired duty cycles can be used.

The lower portion of the curves of FIG. 17 illustrate independent control of each of the four channels, again showing the synchronization order as Channel 1, Channel 3, Channel 2 and Channel 4.

Thus, in accordance with the invention, the driver switch 52 is operated by the timing in the microcontroller 56 to selectively connect the power source 54 to the pulsator valve 40 to deliver power to the valve 40 at a first select level sufficient to energize the valve 40 and subsequently deliver power to the valve 40 at a second select level, lower than the first select level, to maintain energization of the valve and to reduce power consumption. The first level is delivered for a preselect period of time sufficient to ensure turn-on of the valve, followed by a hold-in time at a reduced power level. The reduced power level is obtained by pulse width modulating operation of the driver switch 52 to maintain the second select level. The microcontroller 56 monitors power from the power source via the charge pump circuit 68 and adjusts the pulse width according to monitored power to maintain power at the second select level. The pulse width modulation has the effect of chopping full wave rectified power supplies to the valve to reduce power consumption, with the chopping delay being adjusted according to monitored power to maintain power at the second select level. The chopping is synchronized relative to a zero crossing which is effective to reduce radiated electrical noise. Finally, the microcontroller 56 controls operation of the driver switches 52 to synchronize operation of each of four output channels relative to the other output channels to minimize vacuum fluctuations.

I claim:

1. A milking machine pulsation control for controlling a pulsator having an electrically controlled valve to alternately direct air and vacuum to a milking unit, the pulsation control comprising:

an electrical power source;

driver circuit means electrically connected to the power source and connectable to the valve, in use, for controlling energization of the valve; and timer means connected to the driver circuit means for controlling operation of the driver circuit means, the timer means controlling the driver circuit means to deliver power to the valve at a first select level sufficient to energize the valve and subsequently deliver power to the valve at a second select level, lower than the first select level, by pulse width modulating the driver circuit means to maintain energization of the valve and to reduce power consumption.

2. The pulsation control of claim 1 wherein said timer means delivers power at the first select level for a preselect period of time.

3. The pulsation control of claim 2 wherein said power source develops power at a rated level, comprising the first select level, and said timer means operates the driver circuit means to continuously connect the power source to the valve for the preselect period of time and to subsequently pulse width modulate operation of the driver circuit means to maintain the second select level.

4. The pulsation control of claim 1 further comprising means for monitoring power from the power source and wherein the timer means includes means for adjusting pulse width according to monitored power to maintain power at the second select level.

5. The pulsation control of claim 1 wherein said power source comprises a full wave rectified supply and the driver circuit means comprises a switch selectively connecting the power source directly to the valve, and the timer means drives the switch for a time sufficient to energize the valve and subsequently to pulse width modulate the switch to chop full wave rectified power supplied to the valve to reduce power consumption.

6. The pulsation control of claim 5 further comprising means for monitoring power from the power source and wherein the timer means includes means for adjusting a chopping delay according to monitored power to maintain power at the second select level.

7. The pulsation control of claim 5 further comprising means for detecting a zero crossing of the supply and the timer means synchronizes operation of the switch relative to the zero crossing.

8. The pulsation control of claim 7 wherein the timer means operates the switch at the zero crossing to minimize radiated electrical noise.

9. The pulsation control of claim 5 including means for determining if the valve operates at a lower power level than a rated power level of the supply and wherein the timer means includes means for pulse width modulating the switch during the select time to derive the lower power level.

10. The pulsation control of claim 1 wherein said timer means comprises a programmed processor.

11. A milking machine pulsation control for controlling a pulsator having an electrically controlled valve to alternately direct air and vacuum to a milking unit, the pulsation control comprising:

an electrical power source;

a driver circuit electrically connected to the power source and connectable to the valve, in use, for controlling energization of the valve; and a programmed processor operatively connected to the driver circuit for controlling operation of the driver circuit, the processor operating in accordance with a stored program to control the driver circuit to deliver power to the valve at a first select level sufficient to energize the valve and subsequently deliver power to the valve at a second select level, lower than the first select level, by pulse width modulating the driver circuit to maintain energization of the valve and to reduce power consumption.

12. The pulsation control of claim 11 wherein said power source comprises a full wave rectified supply and the driver circuit comprises a switch selectively connecting the power source directly to the valve, and the processor drives the switch for a time sufficient to energize the valve and subsequently to pulse width modulate the switch to chop full wave rectified power supplied to the valve to reduce power consumption.

13. The pulsation control of claim 12 further comprising means associated with the processor for monitoring power from the power source and wherein the processor is programmed to adjust a chopping delay according to monitored power to maintain power at the second select level.

14. The pulsation control of claim 13 wherein said processor program includes a memory table defining delay time relative to monitored power.

15. The pulsation control of claim 14 further comprising means associated with the processor for detecting a zero crossing of the supply and the processor is programmed to synchronize operation of the switch relative to the zero crossing.

16. The pulsation control of claim 15 wherein the processor is programmed to operate the switch at the zero crossing to minimize radiated electrical noise.

17. The pulsation control of claim 15 including means for determining if the valve operates at a lower power level than a rated power level of the supply and wherein the processor is programmed to pulse width modulate the switch during the select time to derive the lower power level.

18. A milking machine pulsation control for controlling a plurality of pulsators each having one or more electrically controlled valves to alternately direct air and vacuum to a milking unit, the pulsation control comprising:

an electrical power source;

a driver circuit including plural output channels, each output channel being electrically connected to the power source and connectable to an associated one of the valves, in use, for controlling energization of its associated valve; and control means connected to the driver circuit for controlling operation of the driver circuit, the control means controlling the driver circuit to synchronize operation of each output channel relative to the other output channels to minimize vacuum fluctuations.

19. The pulsation control of claim 18 wherein said control means controls all of the output channels to milk at a uniform pulsation rate and controls each output channel independently to maintain a desired milk:rest ratio.

20. The pulsation control of claim 18 further comprising an interface for connecting the pulsation control to other pulsation controls to synchronize the output channels of multiple pulsation controls.

\* \* \* \* \*